Aug. 18, 1942.   S. C. HAYWARD   2,293,138
INDICATOR
Filed May 1, 1940
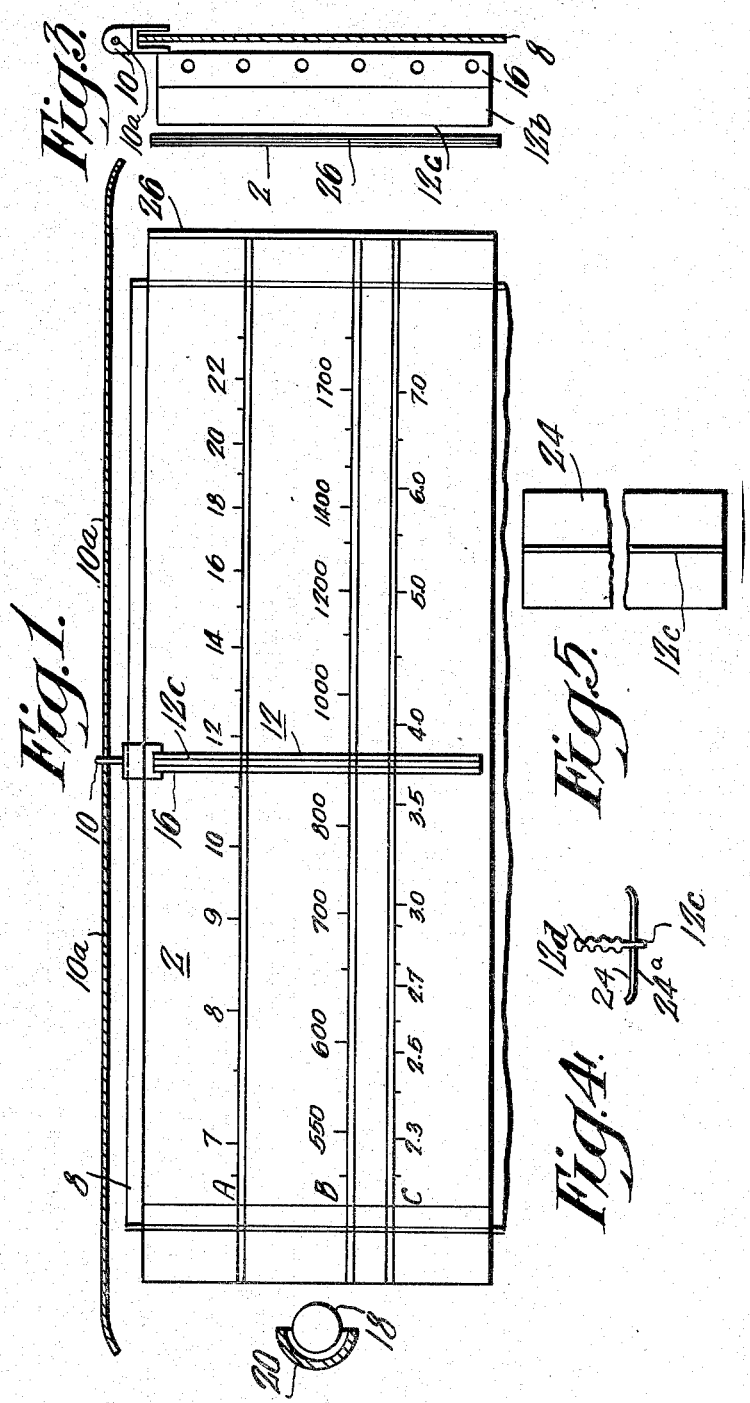
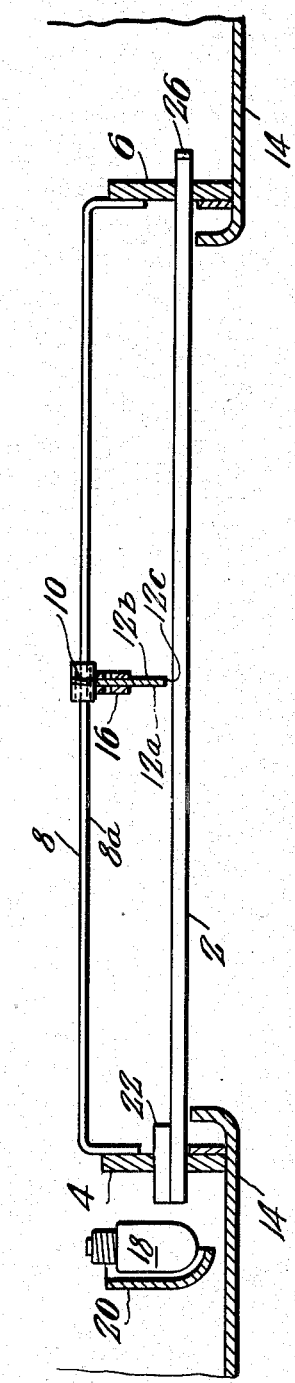
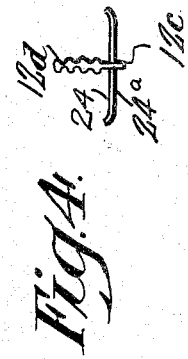
Inventor
Sheldon C. Hayward
By
Attorney Patented Aug. 18, 1942

2,293,138

UNITED STATES PATENT OFFICE 2,293,138

INDICATOR

Sheldon C. Hayward, Merchantville, N. J., assignor to Radio Corporation of America, a corporation of Delaware Application May 1, 1940, Serial No. 332,646

7 Claims. (Cl. 116—124.1)

This invention relates to indicators, particularly to indicators of the type employing a dial scale and a movable pointer and has special reference to the provision of improvements in means for illuminating such pointer and scale.

While the invention will be described as embodied in an indicator for a radio receiver, it is to be understood that the disclosure in this respect is merely illustrative for purposes of explaining the inventive concept and that the invention is readily applicable to indicators for other instruments and apparatus.

It has heretofore been proposed to utilize a pencil, ring or spot of light as pointer for the tuning indicator of a radio receiver. Thus, as shown in U. S. patent to Hyland No. 2,071,284 and in U. S. Patent to Brodton No. 2,122,998, illuminated rod-like or other shaped elements constituted of quartz, or other light-conducting material (e. g., "lucite") have heretofore been used as pointers for radio dials and other scale-bearing surfaces.

Irrespective of the advantages claimed for indicators of the prior art employing light-conducting pointers, it may be said generally that they are more expensive and their structure more complicated than is desirable, in that the source of light for the pointer must be mounted as on a carriage, rack, or shaft for movement with the pointer. When such a pointer and its bulb are mounted for linear movement over a path of substantial length, difficulties may arise due to the necessity of employing trailing wires for conducting current to the lamp. Further, an additional bulb or bulbs have heretofore been required for illuminating the scale across which the pointer moves.

Accordingly, an object of the present invention is to provide an indicator having a movable illuminated pointer and wherein the source of the light for the pointer is mounted at a fixed point remote from the pointer.

Another object of the invention is to provide an indicator comprising an illuminated scale, a movable illuminated pointer therefor, and a common, fixed source of illumination for both the scale and the pointer.

Another object of the invention is to provide an improved indicator employing an edge-lighted glass scale and a movable illuminated pointer, and one wherein the area upon which the scale indicia are marked and the markings per se are apparently uniformly free from the greenish tinge which is characteristic of glass.

Other objects and advantages, together with certain details of construction will be apparent and the invention itself will be best understood by reference to the following specification and to the accompanying drawing wherein Figure 1 is a front elevation; Figure 2 is a top plan view partly in section; and Figure 3 is an end elevation of an indicator constructed in accordance with the principle of the invention.

Figure 4 is a top plan view, and Figure 5 is a front elevation of a modified form of pointer for the indicator shown in Figures 1, 2 and 3.

In the drawing, wherein like reference characters are given to the same or corresponding parts in all figures, 2 designates generally a transparent scale-bearing surface which, in the interests of economy, may comprise a plate of ordinary window glass supported, with one or both of its side edges exposed, in a frame comprising a pair of slotted uprights 4 and 6 into which the glass is fitted. A back plate 8 having an opaque, preferably dark, front face 8a is supported as on the uprights 4 and 6 an inch or so behind the transparent scale-bearing surface 2.

Mounted for movement as on a carriage 10, which may have a sliding fit on the top edge of the back plate 8, in the said space is a pointer 12 which tranverses the bandscales A, B and C on 2. A front panel or escutcheon 14 frames the scale-bearing portion of the surface 2 and conceals its edges, the uprights 4 and 6, the carriage 10, and the cord 10a or other means for driving the carriage 10, from view.

In accordance with the invention, the pointer 12 comprises a blade or strip (i. e., a narrow relatively long piece) formed of a light-conducting material and mounted for movement with its principal or major surfaces 12a, 12b in planes substantially normal to the scale-bearing surface 2. The light-conducting material of which the pointer 12 is constituted may comprise any of a number of "plastic" materials, such, for example, as Celluloid, cellulose acetate, phenolic condensation products or similar material and preferably contains a fluorescent pigment either dispersed throughout its body or applied to its leading edge 12c. To lend rigidity to the strip or pointer 12, it may be clamped preferably adjacent its rear edge in a bracket 16 which is affixed to the carriage or other movable support 10. Alternatively, and as indicated at 12d in Fig. 4, the strip may be corrugated, preferably lengthwise, in which case the effective area of its light-absorbing major surfaces is substantially increased.

For the purpose of illuminating both the scale-bearing surface 2 and the pointer 12, a fixed source of light, exemplified by the single bulb 18, reflector 20 and lens 22 is mounted adjacent one or both side edges of the glass plate 2 behind the front panel 14. The lens 22 is provided for focusing light from the bulb 18 upon the adjacent major surface 12a of the pointer 12. It may, however, be omitted, in which case an aperture should be provided in the bracket 4 in order that the light may impinge the said adjacent major surface 12a of the pointer.

As previously indicated, light picked up on one or both major surfaces 12a, 12b of the pointer is conducted through the body of the strip 12 and appears adjacent its leading edge 12c in the form of a line or mark of other shape determined by the contour of the front edge of the strip. The appearance of the front or leading edge 12c of the pointer may be determined at least in part by the pigment or other coloring material or fluorescent substance incorporated in or applied to the body or the edge of the pointer.

Where it is desirable that only the leading edge 12c of the pointer be visible, a mask may be provided for the side faces thereof. As indicated in Figs. 4 and 5, the mask for the side faces of the pointer may comprise a surface 24 which extends in a plane substantially parallel to the scale-bearing surface 2 and which is supported as on the carriage 10 adjacent the leading edge 12c of the pointer. The front surface 24a of the mask 24 is preferably the same color as the opaque back plate 8, so that it blends therewith and is practically invisible to an observer looking at the indicia upon the scale-bearing surface 2.

It has been found that where (as is preferably the case) the scale markings upon the glass scale-bearing surface are translucent and but a single source of light is provided, then the scale-markings or indicia remote from the light may assume the greenish tinge which is usually characteristic of glass. This greenish tinge is the more pronounced adjacent the end of the scale remote from the light. In order to compensate for this apparent lack of uniformity in the coloring of the indicia or scale markings, the edge of the glass opposite the source of light may be provided with a reflecting surface 26 which may be applied directly to the glass and which is adapted to reflect those rays of the light which tend to be preponderantly absorbed by the glass. Thus, if, as is usually the case, the glass tends to absorb the green rays, the reflector 26 may comprise a red or pink reflecting surface.

Other modifications of the invention will suggest themselves to those skilled in the art. Accordingly, the foregoing is to be interpreted as illustrative and not in a limiting sense except as required by the prior art and the spirit of the appended claims.

What is claimed is:

1. An indicator comprising a transparent scale-bearing surface, a pointer having major and minor surfaces and comprising a strip constituted of light-conducting material mounted for movement across said scale with its major surfaces in planes substantially normal to said scale-bearing surface and having a minor surface presented to said surface, a source of light fixedly mounted in longitudinal alignment with an edge of said scale bearing surface and directed upon a major surface of said light-conducting strip, and means for moving said strip across said scale, toward and away from said source of light.

2. An indicator as set forth in claim 1 and wherein the light-collecting major surface of said strip is corrugated.

3. An indicator as set forth in claim 1 and wherein the minor surface of said strip which is presented to said scale-bearing surface contains a fluorescent pigment which is illuminated from the rear by light conducted thereto through the body of said strip.

4. The invention as set forth in claim 1 and wherein a mask mounted for movement with said pointer conceals the major surfaces of said strip from the view of an observer positioned in front of said scale-bearing surface.

5. An indicator comprising a transparent scale-bearing surface, a back plate mounted in spaced relation with respect to said scale-bearing surface, a pointer having major and minor surfaces and mounted for movement in the space between said back plate and scale-bearing surface, a source of light mounted in longitudinal alignment with an edge of said scale-bearing surface, said pointer comprising a strip constituted of a light-conducting material having a major surface presented to said light source and a minor surface presented to said scale-bearing surface, and a mask mounted for movement with said pointer for concealing the major surfaces of said strip from observation through said transparent scale bearing surface, said mask comprising a frame for said minor surface of said strip and being colored to blend with the color of said back plate.

6. An indicator comprising a transparent plate having translucent indicia thereon, a source of light mounted in longitudinal alignment with an edge of said plate, the optical properties of said plate being such as to preponderantly absorb certain components of said light and to endow the indicia remote from said light with a cast of particular hue, and a reflector formed on the opposite edge of said transparent plate for reflecting the light passing through said transparent plate that tends to be preponderantly absorbed thereby, so that it passes back through said plate to increase the intensity of the light adjacent the said opposite edge thereof.

7. The invention as set forth in claim 6 and wherein said transparent plate is constituted of glass and said reflector comprises a coat of a reddish hue on said opposite edge of said glass plate.

SHELDON C. HAYWARD.